Figure 1:
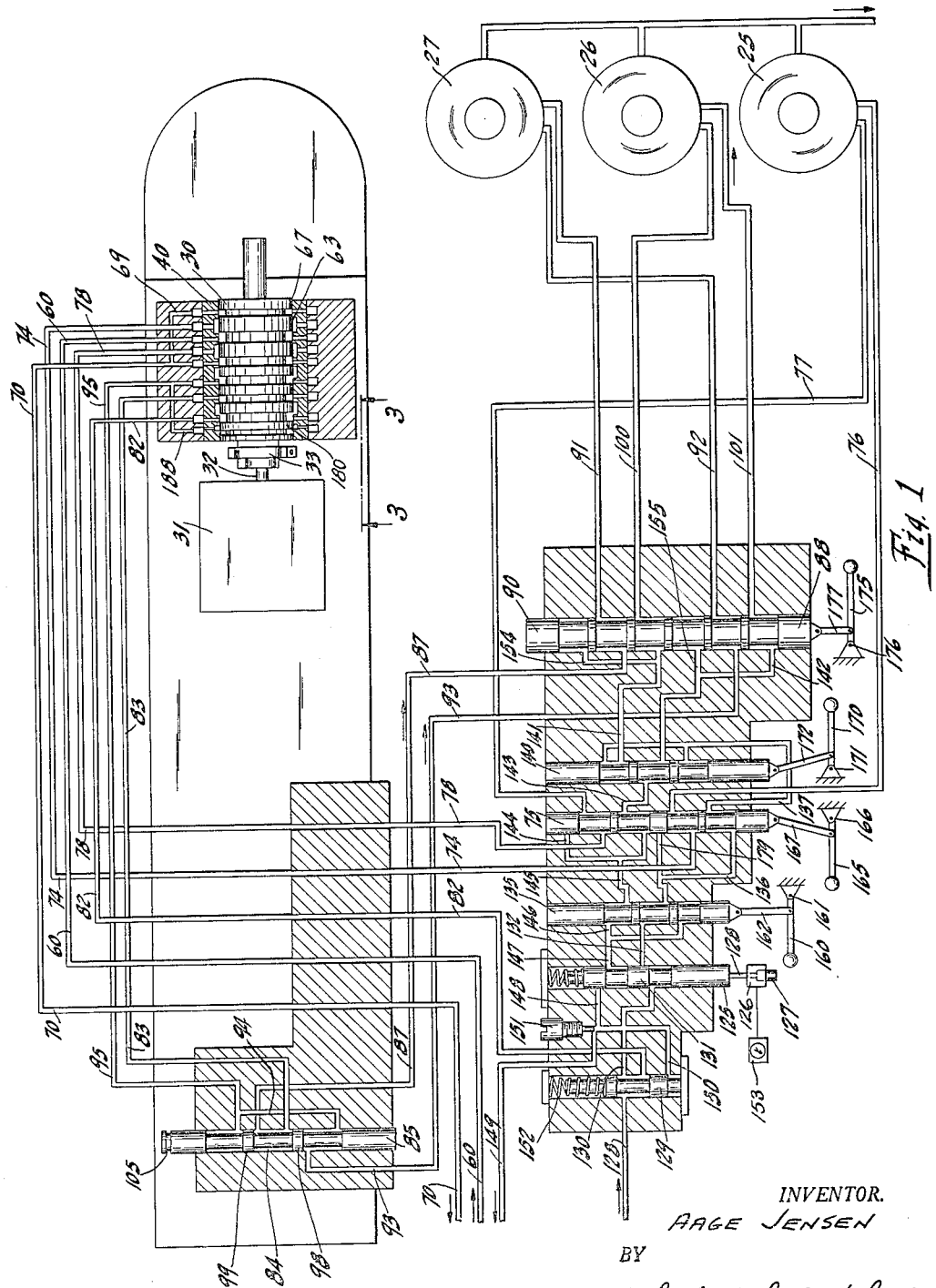

Dec. 21, 1965

A. JENSEN 3,224,463

SPOOL VALVE FOR THE CONCURRENT CONTROL
OF A PLURALITY OF MOTORS

Filed Jan. 16, 1961

2 Sheets-Sheet 1

INVENTOR.
AAGE JENSEN

BY
Wheeler, Wheeler & Wheeler
ATTORNEYS

Dec. 21, 1965   A. JENSEN   3,224,463
SPOOL VALVE FOR THE CONCURRENT CONTROL
OF A PLURALITY OF MOTORS
Filed Jan. 16, 1961   2 Sheets-Sheet 2
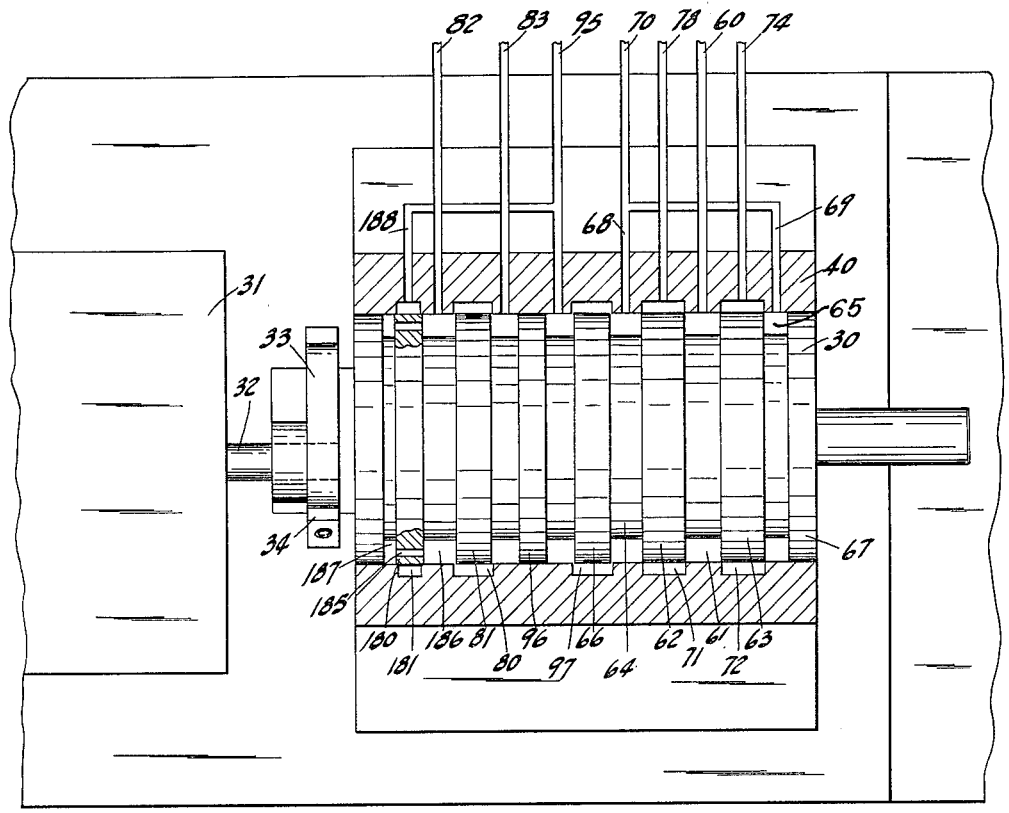
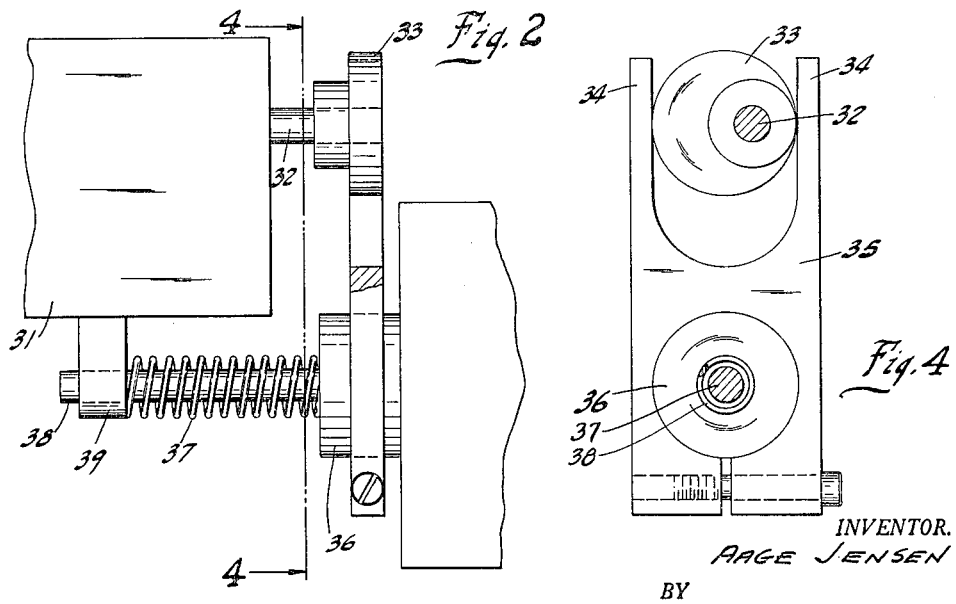
Fig. 2
Fig. 3
Fig. 4
INVENTOR.
AAGE JENSEN
BY
Wheeler, Wheeler & Wheeler
ATTORNEYS

United States Patent Office 3,224,463
Patented Dec. 21, 1965

3,224,463
SPOOL VALVE FOR THE CONCURRENT CONTROL OF A PLURALITY OF MOTORS
Aage Jensen, 2515 Arlington Ave., Racine, Wis.
Filed Jan. 16, 1961, Ser. No. 82,945
6 Claims. (Cl. 137—625.69)

This invention relates to a spool valve for the concurrent control of a plurality of motors. The present application is a companion to my application 723,720, filed Mar. 25, 1958, now Patent No. 2,967,463, issued Jan. 10, 1961.

Among the improvements disclosed in the present application is a means of preventing overrun in a duplex system in which a single tracer-controlled valve synchonously controls any two of the three potential motions between the work and the tool in the tracer system of a machine tool.

The particular point here stressed is the fact that but for the present invention leakage past the multiple purpose valve when the tracer encounters a positive stop in one direction of movement would cause continued relative movement between the work and the tool. A by-pass arrangement functions, under these circumstances, to by-pass liquid under pressure into the return side of the system to equalize leakage pressures and to positively arrest movement within a very few thousandths of an inch.

In the drawings:
FIG. 1 is a hydraulic circuit diagram.
FIG. 2 is a fragmentary detail view showing in balanced position and on a greatly enlarged scale the tracer actuated control valve illustrated in FIG. 1.
FIG. 3 is a fragmentary detail view of portions of the vibrating motor and valve stem of the main control valve as viewed from the plane indicated at 3—3 in FIG. 1.
FIG. 4 is a detail view taken in cross-section on an enlarged scale on the line 4—4 of FIG. 3.

By way of exemplifying a valve embodying the invention, if shown parts of a hydraulic system in which a tracer operates through the controls hereinafter described to regulate certain relative movements between the tool and the tracer on the one hand and the work-supporting table on the other.

In the instant exemplification of the invention the knee actuating motor 25, the saddle actuating motor 26 and the table actuating motor 27 are hydraulic. It may be assumed for the purposes of this disclosure that motors 27 and 26 provide the lead and pick feed while motor 25 provides scanning movement. However, the controls can be connected with different motors to produce different results according to the relative positions of the pattern, the work and the tool. The valving for this control will hereinafter be explained.

The tracer control led spool valve 30 is cylindrical and to minimize the effect of static friction it is subjected to vibration by means of a vibrating motor 31 which may be of the type disclosed in the companion application above identified. The armature shaft 32 of motor 31 carries an eccentric 33 operating between the arms 34 of a lever 35 which is clamped to the stem 36 of the spool valve 30. Thus, as the armature shaft 32 rotates the spool valve is oscillated on its axis.

The spool valve is urged to the right as viewed in FIG. 1 and FIG. 2 by means of a relatively light spring 37 encircling a guide rod 38 which projects from the valve stem 36 and extends through a spring seat 39 depending from the motor 31.

The valve 30 may be shifted axially in its casing 40 against the bias of spring 37 by the operation of the tracer 20.

The tracer will be understood to have a mounting like that shown in FIG. 5 of the companion application above identified and upon which it is universally pivotally movable and axially yieldable. Its end is socketed at 44 to receive a ball 45 which is seated in the socketed fitting 46 of a bellcrank 47 pivoted on a pintle 48. Either oscillation or axial displacement of tracer 20 will oscillate the bellcrank 47 either with or against the bias of spring 37. If the motion results from contact of the tracer with the pattern such motion will be transmitted through the set screw 49 and ball 50 to the valve stem 33 in a direction to move the valve stem to the left as viewed in FIGS. 1 and 2. Any relief of pressure to which tracer 20 is subject in a downward direction will permit movement of valve stem 36 and valve 30 to the right.

The spool valve 30 and its casing 40 provide two synchronized controls. The right hand section of this valve controls the knee to effect either upward or downward movement of the knee according to the position of the valve in its casingg. The left hand section of this valve is called the lead section. According to connections elsewhere effected this section of the valve will cause either the table or the saddle to move in the lead direction, whatever that may be, as controlled by a reverser elsewhere.

FIG. 1 shows the control valve 30 as it appears when displaced to the right under the bias of the aforesaid spring 37. In this position of the parts the knee is moving upwardly to bring the pattern into engagement with the tracer. When the pattern engages the tracer, this engagement instantly will displace the valve to a position corresponding to the contour of the pattern. For example, if the tracer engages the pattern on a steep decline, the valve displacement will be just enough to correctly coordinate the lead motion with the scanning motion to generate that particular angle. When the valve is in balance so far as the operation of the knee is concerned, the valve will be in the position shown in FIG. 2. In reaching this point, the tracer-controlled movement of valve 30 to the left as viewed in FIGS. 1 and 2 has also brought about a forward operation of the lead motor, which may be either the saddle motor 26 or the table motor 27, according to connections made elsewhere. Thus, the cessation of profiling or scanning knee movement is concurrent with initiation of lead movement.

The knee section of the tracer control valve 30 is supplied with hydraulic pressure by a line 60 which opens through the casing 40 into registry with the channel 61 between the lands 62 and 63 of valve 30. Return flow channels are provided at 64 and 65, being defined by lands 66 and 67 respectively. The branch return ducts 68 and 69 with which the return flow channels 64 and 65 of the spool valve communicate merge to form a return duct 70.

The lands 62 and 63 correspond nearly exactly in width with the annular ports 71 and 72 respectively. When valve 30 is moved to the right by the bias of spring 37, as occurs whenever the tracer is out of contact with the pattern, the flow of hydraulic liquid under pressure through the duct 60 and the valve channel 61 enters the annular port 72 and passes through the duct 74 to the knee motor 25 subject to the control of the manually operable valve 75 via duct 76. The return duct 77 from knee motor 25 is likewise controlled by the manually operable spool valve 75 and, in the position of the ports shown in FIG. 1, is led from valve 75 through duct 78 back to the tracer valve casing 40. Since the land 62 is now displaced to the right from registry with the annular port 71 the return flow enters the valve channel 64 and thence passes via branch duct 68 and duct 70 to the sump (not shown).

In the assumed position of the parts as illustrated in

FIG. 1 the tracer is out of contact with the pattern and accordingly the direction of operation of the knee motor 25 will be upward. When the tracer contacts the pattern, the valve 30 is displaced to the left through the lever system already described to place the valve in the balanced position in which it is illustrated in FIG. 2. Since the lands 63 and 62 now register exactly with the casing ports 72 and 71 respectively, line 74 and the line 78 communicating with the knee motor 25 will be shut off and the upward motion of the knee will be arrested.

However, the left hand section of the valve 30 as viewed in FIG. 1 and FIG. 2 controls lead feed, which may be alternated with the pick feed between the table motor 27 and the saddle motor 26 according to the manual setting of the appropriate valve.

The arrangement is such that with the tracer-controlled valve 30 in the centered position in which it is illustrated in FIG. 2 the hydraulic circuit to one or another of these motors 26 or 27 is opened as the hydraulic circuit to the knee motor is closed.

The annular port 80 of the valve casing 40 is .008 inch wider than the land 81 of the valve 30. Accordingly, with the land centered in the port, as is the case when the knee motor comes to rest, the .004 inch clearance on each side of the land 81 provides a by-pass between the pressure line 82 and the hydraulic line 83 which leads to the cylinder 84 in which the reversing spool valve 85 operates.

In the position in which the valve is illustrated in FIG. 2 the flow permitted around land 81 to duct 83 enters the valve cylinder 84 and leaves the cylinder through duct 87 which carries the hydraulic fluid to the valve cylinder 88 in which the manully controlled valve 90 is operated to determine which of the motors 26 or 27 will be used for scanning. In the position in which the valve 90 is illustrated the flow from duct 87 will leave the valve cylinder 88 through duct 91 which connects to the hydraulic table motor 27. The return flow from the table motor is through duct 92 to the valve cylinder 88 and thence through duct 93 to the reversing valve cylinder 84. The flow leaves valve cylinder 84 through branch duct 94 and return duct 95, which enters the tracer valve casing 40 between the lands 96 and 66 of valve 30. The land 66 is similar to land 81 in that it is about .008 inch less in axial extent than the width of the annular port 97 of valve casing 40. Accordingly, in the centered position of valve 30 as shown in FIG. 2, the return flow from duct 95 will pass around land 66 to the annular space 64 between lands 66 and 62, being discharged thence through duct 70 to the sump.

If the reversing valve 85 were moved in a direction which is downwardly as viewed in FIG. 1 its land 98 would place duct 93 in communication with duct 83 rather than with duct 94. At the same time, its land 99 would place duct 87 in communication with duct 95 rather than duct 83. Accordingly, the liquid under pressure would pass from the tracer control valve through duct 83 to duct 92 of the table motor, the return from duct 91 being via ducts 87 and 95, whereby the table motor would operate in a direction which is the reverse of the direction of original operation.

A shift of the scanning control valve 90 downwardly as viewed in FIG. 1 would cut off communication between ducts 87 and 93 and the ducts 91 and 92 of the table motor and would place ducts 87 and 93 respectively in communication with ducts 100 and 101 of the saddle motor, the operation of the saddle motor in forward or reverse being effected subject to control of the reverse valve 85 in the same manner as above described.

Regardless of which of these two motors is actuated in a lead direction by the tracer-controlled valve 30 in the manner above described, it will be found that the other of these two motors is actuated for advance in a pick direction through means hereinafter described. At this time it is desired to stress the fact that the tracer-controlled valve 30 regulates all motion. As that valve reaches the balanced position shown in FIG. 2, wherein the operation of the knee motor 25 is arrested, the hydraulic circuits to one or another of the motors 26 or 27 are opened both in the direction of flow and the direction of return to initiate lead movement. When the contact of the tracer with the pattern further displaces the valve 30 to the left as viewed in FIG. 1 and FIG. 2, the lands 81 and 66 immediately reduce flow to the annular ports 80 and 97. Simultaneously the land 62 will uncover the annular port 71 by a similar amount in a direction to place the pressure line 60 in communication with the line 78. Subject to the position of manually operable valve 75, this will transmit pressure through line 77 to the knee motor 25, return passing through conduit 76 and conduit 74, thus reversing the knee motor to operate it downward.

In operation the lead motor and the scanning motor are always holding the pattern against the tracer, coordinating the two motions at a constant rate of feed by displacing the tracer valve to conform with the contour of the pattern. However, if the tracer continues to be in contact with the pattern, it is presumably engaged with a vertical surface of the pattern and the downward movement of the knee will continue until such surface is cleared. Thereupon the movement of the knee will again be arrested or reversed, as the profiling of the pattern may require. In every instance, as the valve 30 approaches its centered position shown in FIG. 2 it puts the table or the saddle motor into operation in a lead feed direction. Whether such movement is forward or reverse in the direction of lead feed is determined separately by the valve 85 which, in turn, is controlled by a solenoid actuating reverser which will now be described.

I have shown a valve 125 which controls pick feed of the cross feed motor. The showing in FIG. 1 of the solenoid 126 and the armature 127 connected by link 128 with valve 125 is entirely diagrammatic.

Reference has already been made to the pressure line 82 which extends to the tracer-controlled valve 30 to provide power for the lead. The line 82 derives its pressure from the pressure main 128 through the normally open spool valve 129. Regardless of the position of this valve the main 128 communicates through duct 130 with the solenoid operated valve 125 which is normally closed by registration of its land 131 with the output duct 132. When the solenoid 126 is energized to move the valve upwardly as viewed in FIG. 1, the hydraulic liquid under pressure passes from duct 130 to duct 132. In the position in which the manually operated direct controlling valve 135 is illustrated, the duct 132 communicates with duct 136, which is subject to the control of valve 75.

In the position in which valve 75 is illustrated the duct 136 communicates with duct 137 which is subject to the control of another manually operated valve 140. In the position in which valve 140 is illustrated, duct 137 communicates with duct 141 which is subject to the control of the valve 90 already described. In the position of the manually controlled valve 90, as shown in FIG. 1, duct 141 communicates with duct 100. Thus, upon the opening of solenoid operated valve 125 as above described, hydraulic pressure is momentarily admitted to drive the saddle motor 26 for pick or indexing purposes. Return is via duct 101 past valve 90 to duct 142 and past valve 140 to duct 143; thence past valve 75 to duct 144 and duct 145; thence past valve 135 to duct 146 and duct 147; thence past the solenoid operated valve 125 to duct 148 and ducts 149 and 150.

Duct 149 returns to the sump (not shown). It is subject to the control of the throttling needle valve 151 which develops sufficient back pressure in the line 150 so that the valve 129 is displaced against the bias of its spring 152 in a direction to shut off the flow of pressure liquid into line 82 leading to the tracer-controlled valve. In other words, for the period for which the solenoid operated valve 125 is open as above described, the power is shut off from the motor providing the lead—in this case the table motor 27. As soon as the electric timer switch responds and the solenoid operated valve 125 resumes its normally closed position as shown in FIG. 1, the pick motor operation ceases and the pressure on the valve 129 bleeds off to the sump through the needle valve 151 and the normal lead operation resumes.

It will be noted that if the saddle motor 26 is being supplied with power for the lead operation as a result of manipulation of valve 90 as above described, the connections of the pick feed pressure will be reversed as between saddle motor 26 and table motor 27. In that event, the pressure for pick operation as controlled by valve 125 will pass valve 90 through the branch duct 154 to duct 91 leading to the table motor 27, the liquid returning from the table motor through duct 92 and branch duct 155, the connections otherwise being exactly as above described.

The various handles for operating the manually controlled valves are shown only diagrammatically in FIG. 1. The handle 160 pivoted at 161 is connected by link 162 with valve 135. The handle 165 pivoted at 166 is connected by link 167 with valve 75. The handle 170 pivoted at 171 is connected by link 172 with valve 140. The handle 175 is pivoted at 176 is connected by link 177 with valve 90.

In certain operations the pick feed occurs in the knee rather than the saddle or table. Provision is made whereby the opening of normally closed solenoid operated valve 125 may supply pick feed pressure to the knee motor 25. For this purpose the pressure passes from duct 136 through the branch duct 179 when the valve 75 is displaced upwardly as viewed in FIG. 1. The pressure liquid then enters duct 76 leading to the knee motor 25. The return line 77 communicates under these circumstances with the branch duct 144 whereby such liquid is delivered into the line 145 which, as already explained, leads during pick feed operation to the sump return line 149.

Provision is thus made for operating any two of the three motors by the tracer-controlled valve 30 in lead and scanning or profile directions, the remaining motor being automatically operated for pick feed.

In view of the fact that the tracer-controlled valve 30 regulates the operation of two motors rather than one, transferring its regulatory effect from one to the other as above described, it becomes particularly important to eliminate the possibility of overrun of this valve. Reference has already been made to the fact that this valve includes two sections, the lands 62 and 63 controlling forward and reverse operation of the knee motor 25 to raise and lower the knee according to contact of the tracer with the pattern on the table. The lands 81 and 66 control the pressure and exhaust movements of the hydraulic liquid to and from the lead motor, whether that be the motor 27 of the table or the motor 26 of the saddle.

For the purpose of stabilizing the operation of the tracer-controlled valve 30, and precluding overrun, an additional land 180 is carried by valve 30. In the centered position of valve 30 as illustrated in FIG. 2, the land 180 registers with an annular port 181 which it overlaps by about .004 inch on each side. In other words, the lap of the land 180 with respect to the casing wall at opposite sides of port 181 is approximately equal to the clearance provided between each of the lands 81 and 66 with respect to the margins of the wall at opposite sides of the respective ports 80 and 97.

The land 180 has a pressure balancing orifice through it at 185 which provides communication between the annular channel 186 of the valve and the annular channel 187 of the valve. By reason of this orifice, both of the channels 186 and 187 are under the pressure of the hydraulic liquid applied through duct 82. A by-pass duct 188 provides communication between the annular port 181 and the line 95, which is a return line for the hydraulic liquid used in lead feed. By reason of this arrangement, any leakage in the valve which could result in delivering hydraulic liquid under pressure to the lead feed motor, whichever this may be, is equalized by an opposite pressure applied on the return line to balance the pressures on the lead feed motor and maintain it stationary until a tracer responsive movement of the valve actually requires motor operation. This pressure equalizing by-pass 188 has proved very effective in precluding motor creep due to bleeding past the valve. It has very significant advantages in any such valve but is particularly important in a valve which controls two separate operations.

I claim.

1. A spool valve having means for balancing pressures occasioned by leakage, said valve comprising a valve spool having first, second, third and fourth lands mutually spaced, and a casing with which said lands are in bearing contact, said casing including a first port with which the first land is normally in register, a hydraulic liquid pressure supply connection opening to the casing between the first land and the second land, said casing having a second port with which the second land is normally in register, the width of the second port slightly exceeding the width of the second land, a pressure liquid discharge connection communicating with the casing between the second land and the third land, a liquid return connection communicating with the casing between the third land and the fourth land, said casing further having a port with which the fourth land is normally in register and which is slightly wider than the fourth land, and a liquid discharge connection opening through the casing beyond the fourth land, and means providing a bypass connection from the first mentioned port to the liquid return connection.

2. The device of claim 1 in which said spool valve further includes liquid confining means in spaced relation to the first land and the fourth land, said first land having a pressure balancing orifice opening through it for balancing pressures on opposite sides of the first land, the first land substantially corresponding in axial extent to the first mentioned port whereby any displacement of the valve spool respecting the casing will admit liquid under pressure from one side of the first mentioned land into the bypass connection.

3. A spool valve for concurrent control of first and second hydraulic motors to require the operation of one when the other is inoperative and to preclude the operation of either when the other is operative, said valve comprising a casing provided with pressure supply and exhaust ports and with first-motor pressure and return ports and second-motor pressure and return ports, and means for selectively opening and closing the first-motor ports and the second-motor ports in alternation and for subjecting both of the second-motor ports to the pressure of the pressure supply port when the first-motor ports communicate with the pressure supply and exhaust ports respectively; said means comprising a valve spool reciprocable in the casing to and from a predetermined position and having lands complementary to casing portions adjacent certain of said ports, said lands constituting means effective in the said position of said spool for closing the first-motor pressure and return ports against pressure and exhaust port communication while opening second-motor pressure and return ports to pressure and exhaust port communication, said valve spool lands further constituting means for opening the first-motor pressure and return ports to supply and exhaust port communication while closing the second-motor pressure and return ports from pressure supply and exhaust port communication when said spool is displaced from said position, and further constituting means for providing cross connection between the second-motor pressure and return ports when said spool is displaced from said position, thereby equalizing pressure to which said second-motor ports are subject when said first-motor ports respectively communicate with said pressure supply and exhaust ports.

4. A spool valve for concurrent control of first and second hydraulic motors and including a casing having pressure supply and exhaust ports, and a valve spool reciprocable in the casing in each direction from a predetermined central position and constituting means for energizing the first and second motors in alternation, and for rendering each inoperative when the other is energized, said casing having first-motor pressure and return ports and second-motor pressure and return ports, said valve spool having lands controlling the several ports aforesaid, said lands and casing having complementary parts coacting in the said position of said spool to shut off the pressure supply and exhaust ports from communication with the first-motor ports and having other lands and complementary portions of casing from which such other lands are spaced when the spool is in said position for establishing communication between said pressure supply port and said second-motor pressure port and for establishing communication between said exhaust port and said second-motor return port, displacement of said spool from said position establishing communication between the pressure supply and exhaust ports and the first-motor pressure and return ports respectively while shutting off communication, save for leakage, between the pressure supply and exhaust ports and the second-motor pressure and return ports respectively, said casing further being provided with a bypass port in communication with the second-motor return port and said spool including a land complementary to the bypass port and adapted in the said central position of the spool to close the bypass port and further adapted upon displacement of the spool from said position to open the bypass port to communication with said pressure supply port whereby to neutralize pressure leaking into the second-motor pressure port by admitting like pressure through said bypass port to the second-motor return port.

5. A spool valve according to claim 4 in which said last mentioned land has an axial extent only slightly greater than that of the bypass port whereby said land clears the bypass port in either direction of movement of the valve spool from said predetermined central position, said last mentioned land having an opening through the land and having channels at opposite sides of the land, one of which registers with said pressure supply port, whereby movement of said spool in either direction from said central position admits pressure from said pressure supply port to the bypass port whereby to equalize pressure between the second motor pressure return ports.

6. A spool valve according to claim 5 in which said casing and said spool lands have complementary portions adjacent the first-motor pressure and return ports for selectively providing communication between the pressure supply port and either of said first-motor ports, according to the direction of displacement of the spool from said position, and for placing the other of such first-motor ports in communication with the exhaust port.

References Cited by the Examiner

UNITED STATES PATENTS

| 1,123,273 | 1/1915 | Gregersen | 251—282 XR |
| 2,167,281 | 7/1939 | Monroe | 91—464 XR |
| 2,621,676 | 12/1952 | Toft | 251—282 XR |
| 2,622,616 | 1/1952 | Humes | 251—3 |
| 2,749,810 | 6/1956 | Turchan | 90—13.5 |
| 2,868,227 | 1/1959 | Stephens | 137—622 |
| 2,949,893 | 8/1960 | McCurdy. | |
| 2,953,164 | 9/1960 | Haberhand et al. | 137—622 |
| 2,967,463 | 1/1961 | Jensen | 90—13.5 |
| 3,026,680 | 3/1962 | Evans | 60—97 |

M. CARY NELSON, *Primary Examiner.*

THOMAS E. BEALL, KARL J. ALBRECHT, MARTIN P. SCHWADRON, *Examiners.*